United States Patent
Day et al.

(10) Patent No.: US 11,945,934 B2
(45) Date of Patent: Apr. 2, 2024

(54) SMOKE SUPPRESSANT COMPOSITIONS

(71) Applicant: Mexichem Specialty Compounds, Inc., Leominster, MA (US)

(72) Inventors: James F. Day, Kernersville, NC (US); Mark A. Jozokos, Pelham, NH (US); William Pavilionis, Oxford, MA (US)

(73) Assignee: Mexichem Specialty Compounds, Inc., Leominster, MA (US)

( * ) Notice: Subject to any disclaimer, the term of this patent is extended or adjusted under 35 U.S.C. 154(b) by 185 days.

(21) Appl. No.: 17/372,449

(22) Filed: Jul. 10, 2021

(65) Prior Publication Data

US 2022/0010099 A1 Jan. 13, 2022

Related U.S. Application Data (60) Provisional application No. 63/050,538, filed on Jul. 10, 2020.

(51) Int. Cl.
| | |
|---|---|
| *C08K 9/10* | (2006.01) |
| *B05D 1/02* | (2006.01) |
| *B05D 3/10* | (2006.01) |
| *B05D 3/14* | (2006.01) |
| *C08K 5/56* | (2006.01) |
| *C08L 27/06* | (2006.01) |
| *B82Y 30/00* | (2011.01) |

(52) U.S. Cl.
CPC ............... *C08K 9/10* (2013.01); *B05D 1/02* (2013.01); *B05D 3/101* (2013.01); *B05D 3/144* (2013.01); *C08K 5/56* (2013.01); *C08L 27/06* (2013.01); *B05D 2506/25* (2013.01); *B82Y 30/00* (2013.01); *C08K 2201/005* (2013.01); *C08K 2201/011* (2013.01)

(58) Field of Classification Search
CPC ...... C08K 9/10; C08K 5/56; C08K 2201/005; C08K 2201/011; C08K 2003/2255; B05D 1/02; B05D 3/101; B05D 3/144; B05D 2506/25; B82Y 30/00; B01J 2/00
USPC ....................................................... 523/205
See application file for complete search history.

(56) References Cited

U.S. PATENT DOCUMENTS

| | | | |
|---|---|---|---|
| 4,153,792 A | 5/1979 | Kroenke | |
| 4,307,010 A | 12/1981 | Sandler et al. | |
| 4,859,365 A * | 8/1989 | Peninger | C09K 21/04 |
| | | | 524/398 |
| 5,985,236 A | 11/1999 | Khan et al. | |
| 6,235,261 B1 | 5/2001 | Khan et al. | |
| 8,070,990 B2 | 12/2011 | Ho et al. | |
| 2011/0031454 A1 | 2/2011 | Ho et al. | |
| 2014/0163171 A1 | 6/2014 | Cernohous et al. | |
| 2016/0257609 A1 | 9/2016 | Karalis et al. | |

OTHER PUBLICATIONS

USPTO, International Search Report and Written Opinion for PCT Application No. PCT/US21/40101, dated Oct. 20, 2021 (14 pages).

* cited by examiner

*Primary Examiner* — Hannah J Pak
(74) *Attorney, Agent, or Firm* — Joseph T. Leone; DeWitt LLP

(57) ABSTRACT

Compositions and methods for producing smoke suppressants are disclosed. The smoke suppressant molecularly encapsulates a naturally-occurring inorganic substrate, such as expanded volcanic ash. These intercalated smoke suppressant compositions have particular utility for smoke suppression in polyvinyl chloride (PVC), both flexible and rigid compounds as well as other polymeric resins and materials.

12 Claims, 7 Drawing Sheets

SMOKE SUPPRESSANT COMPOSITIONS

CROSS REFERENCE TO RELATED APPLICATIONS

The present application claims the benefit of U.S. Provisional Patent Application No. 63/050,538 filed Jul. 10, 2020, the disclosure of which is incorporated by reference herein in its entirety.

FIELD OF THE INVENTION

The present invention relates to compositions and methods for producing smoke suppressants.

BACKGROUND OF THE INVENTION

Vinyl chloride and vinylidene chloride polymers are known to be self-extinguishing and relatively more flame retardant than other polymers such as polyethylene, polypropylene, and the like. However, a substantial amount of smoke may be produced upon exposure of vinyl chloride and vinylidene chloride polymers to a flame.

Inorganic and organometallic complexes of molybdenum are commercially useful as smoke suppressants in halogenated resins. Various amine molybdates have been investigated by B. F. Goodrich, see U.S. Pat. No. 4,153,792 for smoke suppression in polyvinyl chloride (PVC) compounds. These compounds were plagued with poor performance properties due to residual molybdenum trioxide ($MoO_3$). This residual $MoO_3$ causes blue discoloration of the resin systems coupled with poor thermal stability.

The most commercially recognized material for smoke suppression in PVC is ammonium octamolybdate (AOM). AOM is a premium material to make low smoke PVC compounds, particularly for plenum wire and cable applications. AOM is used in numerous PVC jacket formulations that pass the rigorous UL-910: Standard for Safety Test for Flame-Propagation and Smoke-Density Values for Electrical and Optical-Fiber Cables in Spaces Transporting Environmental Air; as well as the replacement testing procedure NFPA 262: Standard Method of Test for Flame Travel and Smoke of Wires and Cables for Use in Air-Handling Spaces for cables (copper conductor and fiber optic cables).

Other commercial molybdate products are cost-effective flame retardants and smoke suppressants based on patented surface treatment technology. These smoke suppressant chemistries include zinc molybdate, calcium zinc molybdate, melamine molybdate and zinc oxide/phosphate complexes.

These products are designed to replace the more expensive AOM compounds with less expensive core/shell structures where expensive active phase (molybdate) is deposited on the surface of less expensive inert core particles, such as magnesium hydroxide, calcium carbonate, talc and zinc oxide. These molybdate smoke suppressants are highly effective in PVC but are not as effective as AOM in PVC compounds.

Cyprus Amax Minerals Company, see U.S. Pat. Nos. 5,985,236 and 6,235,261, developed an aqueous or "wet" process for producing AOM, overcoming the disadvantages of the thermal method. This "wet" method yields a novel isomer ("X-AOM") when combining ammonium dimolybdate (ADM) with $MoO_3$ using a gradual delivery procedure along with a carefully controlled heating stage, by the below stoichiometric formula:

$$2(NH_4)_2MoO_7 + 4MoO_3 \rightarrow X\text{-}(NH_4)_4Mo_8O_{26} \text{ (or X-AOM)} \quad (1)$$

The distinctive character of the novel isomer is analytically determined using Raman spectroscopy with a unique peak at 796-798 $cm^{-1}$ (see, e.g., FIG. 2 in U.S. Pat. Nos. 5,985,236 and 6,235,261). The AOM with this novel isomer also has improved smoke suppression properties in PVC compounds.

J. M. Huber Corporation, see U.S. Pat. No. 8,070,990, precipitated AOM in the presence of an inert mineral core (talc) to produce a high surface area smoke suppressant. This process describes the formation of discreet rods with surface area 1.5 to 2.5 times higher than commercial supplies of AOM. Smoke suppressant with approximately 75% AOM precipitated on the talc core achieves comparable smoke suppression and flame retardancy to commercial bulk AOM in both flexible and rigid PVC compounds.

Figure 1:
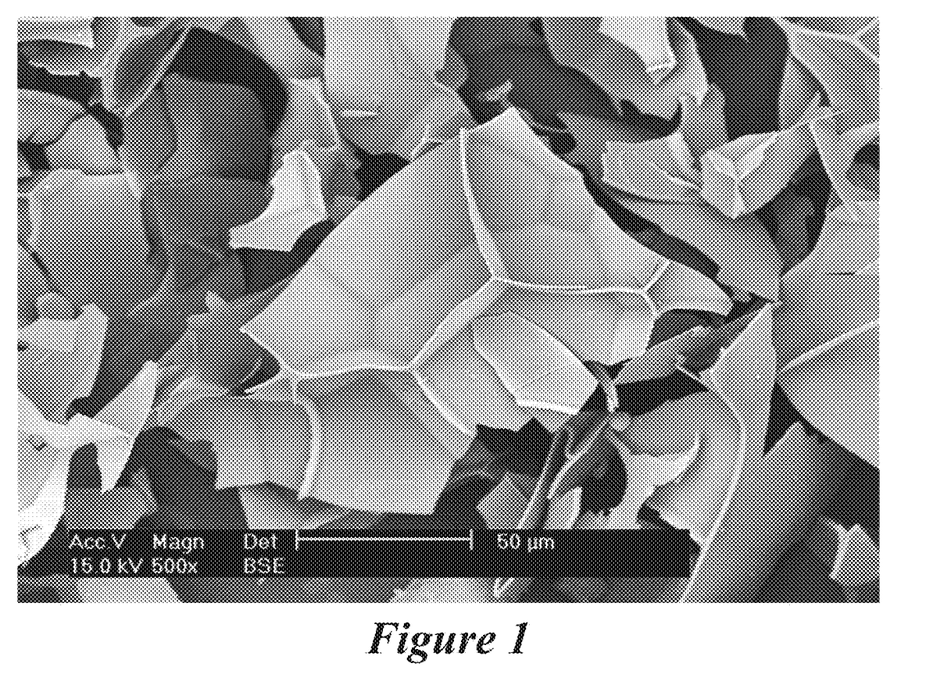
FIG. 1 is a scanning electron micrograph of expanded volcanic ash.

Volcanic ash is an amorphous volcanic glass that has a relatively high water content, typically formed by the hydration of obsidian. Typically, volcanic ash has 3-5 wt % contained water. It occurs naturally and has the unusual property of greatly expanding when heated sufficiently. For example, when the volcanic ash is calcined at about 1700° F., it dehydrates and turns into a very high surface area substrate. After calcining/expansion the water content is less than 0.1 wt %. Literally, billions of pounds of volcanic ash are deposited globally. Such materials have found applications as abrasives, insulation and as filtration aids because of their unique material properties. Specifically, volcanic ash has relatively high surface area, aspect ratio and hardness. Volcanic ash softens when it reaches temperatures of 850-900° C. (1,560-1,650° F.). Water trapped in the structure of the material vaporizes and escapes, and this causes the expansion of the material to 7-16 times its original volume. The expanded material is a brilliant white, due to the reflectivity of the trapped bubbles. Unexpanded ("raw") volcanic ash with the trapped water has bulk density around 1100 $kg/m^3$ (1.1 $g/cm^3$), while typical expanded volcanic ash with the trapped water removed or substantially removed has a bulk density of about 30-150 $kg/m^3$ (0.03-0.150 $g/cm^3$). A scanning electron micrograph of expanded volcanic ash is shown in FIG. 1.

SUMMARY OF THE INVENTION

The smoke suppressant composition disclosed herein is a substrate microencapsulated by a smoke suppressant over at least a portion of the substrate. The composition is suitable as an additive to polymeric composites such as polyvinyl chloride or other halogenated resins. The composition is capable of arresting flames and reducing the evolution of smoke from the burning polymeric composite. In some embodiments, the use of a substrate possessing at least a partially coated outer surface of the smoke suppressant enables very effective performance while reducing the loading levels over conventional smoke suppressant additives. It is believed that the efficacy of the composition as smoke suppressant materials is due to the enhanced ratio of mass to surface area resulting from the application of the smoke suppressant to the substrate. In that regard, the mass of the smoke suppressant has greater exposure than a single smoke suppressant particle of the same mass. Additionally, polymeric composites employing the smoke suppressant composition possess desirable mechanical properties.

In certain embodiments, the composition is formed by synthesizing the smoke suppressant in the presence of a high surface area substrate that has been chemically modified to improve the microencapsulation of the substrate by the smoke suppressant. Other additives may also be used to improve desired properties of the polymeric composite. The composition may then be employed as a smoke suppressant and flame retardant additive in a polymeric composite.

The compositions are capable of arresting or stopping flame propagation and smoke evolution in polymeric materials. For example, certain embodiments exhibit properties that pass testing criteria of UL-910 or NFPA-262 test procedures. The substrate, with at least a partial microencapsulation of the smoke suppressant chemical, is well suited for forming composites with polymeric materials. In certain embodiments, the polymeric composite is formed using melt processing techniques. The polymeric composites are suitable for manufacturing articles in the construction, electronics, consumer goods and automotive industries.

In accordance with one embodiment of the invention, a smoke suppressant composition includes a substrate formed from volcanic ash and a smoke suppressant disposed on at least a portion of the substrate. In related embodiments, the volcanic ash may be expanded or unexpanded volcanic ash. The smoke suppressant may be ammonium octamolybdate (AOM). The volcanic ash may be formed from particles having an average particle size between about 50 nm to about 5 microns in diameter. The particles may be milled. The smoke suppressant may have a thickness between about 1 nm to about 1 micron. The smoke suppressant composition may further include a multi-functional coupling agent bonded to the substrate. The multi-functional coupling agent may include one or more of silanol, methoxy, ethoxy, or amino functional groups that are bonded to the substrate. The multi-functional coupling agent may include two or more types of functional groups and the functional groups may be formed from amines, carboxylic acids, alcohols, esters, anhydrides, epoxides and/or unsaturated hydrocarbons.

In accordance with another embodiment of the invention, a polymeric composite includes a halogenated resin and an additive including the smoke suppressant composition mentioned above. In related embodiments, the polymeric resin may include halogenated polymers, vinyl polymers, polyolefins, polyesters, polyacrylates, polyamides, polycarbonates, polyurethanes, silicones, epoxides and/or rubbers. For example, the polymeric resin may include polyvinyl chloride or vinylidene chloride.

In accordance with another embodiment of the invention, a method of forming a smoke suppressant composition includes providing a substrate formed from volcanic ash and forming a smoke suppressant on at least a portion of the substrate. In related embodiments, the smoke suppressant may be formed on the portion of the substrate by synthesizing a smoke suppressant chemical in-situ in a presence of the substrate. The smoke suppressant chemical may include ammonium octamolybdate, zinc molybdate, calcium zinc molybdate, melamine molybdate and/or zinc oxide/phosphate complexes. The smoke suppressant may be ammonium octamolybdate (AOM) formed by reacting ammonium dimolybdate with molybdenum trioxide in water in the presence of the substrate. The method may further include applying a surface modification to the substrate before the smoke suppressant chemical is synthesized in-situ. The surface modification may be applied using a solution phase or spray coating. The surface modification may include a silane modification or a plasma modification.

BRIEF DESCRIPTION OF THE DRAWINGS

The foregoing features of the embodiments will be more readily understood by reference to the following detailed description, taken with reference to the accompanying drawings, in which.

DETAILED DESCRIPTION OF THE INVENTION

Embodiments of the present invention include a substrate formed from volcanic ash and a smoke suppressant disposed on at least a portion of the substrate. The smoke suppressant may be AOM or synthesized AOM. Surface modification of the substrate may be further used to assist with the coating of the smoke suppressant on the substrate, e.g., silane modification and plasma modification. Surface modification may include the application of a multi-functional coupling agent. For example, a silane with a pendant amine group may be used as a multi-functional coupling agent to aid the coating or microencapsulation of the smoke suppressant onto the substrate and to impart hydrophobic properties to the substrate.

The techniques used to synthesize AOM in-situ, while coating the substrate, e.g., expanded volcanic ash, surprisingly has a much higher percentage (approximately 20-25%) of the "X-AOM" isomer than commercial AOM supplies formed according to the prior art. This higher degree of X-AOM isomer seems to improve the smoke suppressant and flame retardant properties of that particular composition. In addition, the smoke suppressant composition formed according to embodiments of the present invention does not have a rod-like morphology of the prior art AOM, but has a unique sheet-like morphology. Because of the sheet-like morphology, the smoke suppressant composition has extremely high surface area and efficacy as a smoke suppressant and flame retardant in both flexible and rigid PVC compounds that is higher than prior art materials.

In one embodiment, a smoke suppressant composition is formed by synthesizing a smoke suppressant chemical in-situ with a suitable substrate thereby coating or microencapsulating at least a portion of the substrate with the smoke suppressant chemical. The composition is suitable as a smoke suppressant and flame retardant additive in polymeric matrices, in particular halogenated resins such as vinyl chloride and vinylidene chloride polymers.

The substrate may be made of any material that is capable of being coated or microencapsulated by a smoke suppressant that allows for the sheet-like morphology of the smoke suppressant coating. For example, the substrate may be volcanic ash, microspheres, glass fibers, metal oxides, or minerals. In one embodiment, the substrate is formed from particles having an average particle size up to 100 microns in diameter. In other embodiments, the average particle size of the selected substrate may vary between about 5 nm and about 100 microns, preferably between about 5 nm and about 10 microns, more preferably between about 3 and 10 microns.

The substrate, upon application of the smoke suppressant chemical by microencapsulation, is intended as an additive or filler in a polymeric matrix. In that regard, the sizing, shape and specific type of substrate is selected to achieve the desired result in a specific polymeric composite. One of ordinary skill in the art is capable of selecting a specific substrate for a given application.

Any naturally occurring inorganic material is suitable for the present invention. Preferred embodiments are those that incorporate expanded volcanic ash, unexpanded volcanic ash, mica, fly ash, andesiteic rock, feldspars, aluminosilicate clays, obsidian, diatomaceous earth, bauxite, geopolymers pumice, perlite, pumicsite and combinations thereof. These substrates may also be milled to have average particle sizes of about 50 nm to about 5 microns in diameter. A most preferred material is expanded volcanic ash that has been milled.

Volcanic ash is a volcanic rock that, when heated to approximately 900° C., softens volcanic glass making the water molecules trapped in the rock evaporate and expand the particles, similar to popcorn. These expanded particles are actually groups of small round, light and insulating glass particles. Broken spheres and spheres having openings on their surface help with the capacity of containing air and water, which feature is especially significant in horticulture. Expanded volcanic ash particles subsequently ground and crushed exhibit a labyrinth of jagged interlocking structures to create billions of microscopic channels that may be used to filter and clean a large variety of liquids, beverages, and pharmaceutical products. This expanded, milled volcanic ash is the most preferred substrate for deposition of smoke suppressant chemicals.

Additionally, surface modification of the substrate, e.g., silane modification and plasma modification, may be used to assist the formation of the smoke suppressant chemical while it is being synthesized in-situ in the presence of the substrate. Surface modification may include the application of a multi-functional coupling agent. For example, the multi-functional coupling agent may have at least one of silanol, methoxy, ethoxy, or amino functional groups to bond with the substrate.

In one embodiment, a silane with a pendant amino group is well suited as a multi-functional coupling agent. The surface modification may be a precursor step in the formation of the smoke suppressant chemical microencapsulation coating. Conventional surface modification techniques are generally known by those of ordinary skill in the art. In some embodiments, solution phase or spray coating techniques, utilizing the intended substrates with the designated silane, may be utilized.

The smoke suppressant chemical is synthesized in-situ in the presence of the surface modified substrate. The smoke suppressant precipitates in a controlled manner onto the surface modified substrate and encapsulates at least a partial coating on the substrate. The coating thickness may vary from about 1 nm to about 1 micron.

A variety of smoke suppressant chemicals may be utilized in these compositions. These smoke suppressant chemistries include ammonium octamolybdate, zinc molybdate, calcium zinc molybdate, melamine molybdate and zinc oxide/phosphate complexes, with AOM being the most preferred chemistry. These chemistries can be deposited on the substrate at levels of 1 to 99 wt %, with 25-75 wt % preferred and 40-50 wt % most preferred, with the percentage based on elemental analysis for molybdenum content.

AOM is synthesized by the controlled reaction of ammonium dimolybdate with molybdenum trioxide in solvent (water) in the presence of the surface modified substrate. The controlled precipitation imparts at least a partial coating of the substrate. For example, 30-60% of the surface area may be coated, preferably 40-50%. The substrate promotes the formation of sheet-like morphology rather the rod-like structures of extremely high surface area, much higher than commercial AOM supplies. The surface area is much higher than talc-based compositions. Compositions of 40 wt % AOM on modified expanded volcanic ash has been found superior in smoke suppression and flame retardance without alteration of the mechanical properties or compound color versus commercial AOM supplies. Also, Raman spectroscopic studies indicate a 20-25% increase in the desired "X-AOM" isomer versus commercial AOM supplies. This "X-AOM" isomer is believed to improve the efficacy of the composition for smoke suppression and flame retardant properties of the polymeric composite.

The smoke suppressant chemistries applied onto a substrate may exhibit enhanced smoke suppressant and flame retardant properties or reduce the overall amount of smoke suppressant and/or flame retardant materials needed in a polymer to prevent or arrest flame propagation and smoke evolution. This property is partly due to the mass to surface area ratio resulting from the application of the smoke suppressant onto the substrate. In this regard, the mass of the smoke suppressant chemical has greater exposure than a single smoke suppressant particle of the same mass. In some embodiments, mixtures of various smoke suppression chemistries possess a synergistic smoke suppression effect.

In one alternative embodiment, a multifunctional coupling agent is used to assist in the deposition of the smoke suppressant chemical on the substrate. The multifunctional coupling agent also aids in compatibilizing the composition into the polymeric composite. Functional groups of these coupling agents included those formed from amines, carboxylic acids, alcohols, esters, anhydrides, epoxides and unsaturated hydrocarbons. In one embodiment, a minimum of two types of functional groups exist on the multifunctional coupling agent. Those of ordinary skill in the art recognize that selected components and reaction conditions may require different functional groups or process conditions, such as temperature, concentration, pH, use of a catalyst, and the like.

The smoke suppressant deposited on the modified substrate is well suited for dispersion into a polymeric matrix to produce a composite. The matrix may include various materials that can accept the smoke suppressant composition. For example, polymers and copolymers, including halogenated polymers, vinyl polymers, polyolefins, polyesters, polyacrylates, polyamides, polycarbonates, polyurethanes, silicones, epoxides and rubbers, may be used for the matrix. The composition could be used in any thermoplastic or thermoset resin that processes below the decomposition temperature of the smoke suppressant composition.

In another embodiment of the invention, the melt-processable composite may contain other additives. For example, conventional additives may include plasticizers, antioxidants, light stabilizers, fibers, blowing agents, foaming agents, anti-blocking agents, heat stabilizers, flame retardants, impact modifiers, biocides, compatibilizers, tackifiers, colorants, coupling agents, fillers, pigments and the like. The additives may be incorporated into the melt processable composition in the form of powders, granules, pellets, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve the desired physical properties of the finished article.

The melt processable compositions may be prepared by any of a variety of ways using melt processing techniques. For example, the smoke suppressant composition, the optional additives, and the polymeric matrix can be combined together by any blending means usually employed in the plastics industry, such as with a compounding mill, a Banbury mixer, or a mixing extruder. The materials may be used in the form, for example, of a powder, a pellet and/or a granular product. The mixing operation is most conveniently carried out at a temperature above the melting point or softening point of the polymer employed. The resulting melt-blended mixture can be either extruded directly into the form of the final product shape or pelletized or otherwise comminuted into a desired particulate size or size distribution and fed to an extruder that melt processes the blended mixture to form the final product shape. Alternatively, the composition may be molded into a desired form. The resulting polymeric composite exhibits superior performance when produced using this protocol.

In another embodiment, the smoke suppressant composition may be melt processed with a polymer to form a masterbatch. The masterbatch is then let down to the desired level of smoke suppressant additive in a subsequent melt processing step. This two step process can have the effect of improving dispersion of the additive and the chemical and mechanical properties of the final compound. Those skilled in the art of melt processing polymer compositions are capable of selecting processing steps to achieve a desired level of intermixed components.

Melt processing typically is performed at a temperature from about 80 to about 300° C., although operating temperatures are selected depending upon processing parameters, e.g., the melting point, melt viscosity, and thermal stability of the composition. Different types of melt processing equipment, such as extruders, may be used to process the melt processable compositions described herein. Those skilled in the art of melt processing are capable of selecting the extruders suitable for use with embodiments of the present invention.

The composites described herein are suitable for manufacturing articles, for example, in the construction, electronics, wire and cable, consumer goods and automotive industries. For example, articles incorporating the composition of embodiments of the present invention may include molded architechural products, forms, automotive products, building components, household articles or electronic goods.

The resulting articles produced by melt processing these materials exhibit superior smoke suppression and flame retardant properties. The composite of the polymer, smoke suppressant composition and various other additives, passes a number of ratings, including UL-94, ASTM-E84/ANSI/UL 723, UL-910 and NFPA-262 testing.

EXAMPLES

Example 1

Surface Modification of Expanded Volcanic Ash

A total of 1000 grams of micronized and expanded volcanic ash (Kansas Minerals, Inc. Mankota, KS) was mixed with 40 grams of aminoethylaminopropylsilane triol homopolymer (Dow Corning Z-6137) in 960 grams of deionized water and stirred overnight. The slurry was filtered with a Buchner funnel, rinsed with water, and dried at 105° C. to constant weight.

Example 2

Surface Modification of Expanded Volcanic Ash

A total of 1000 grams of micronized and expanded volcanic ash was mixed with 40 grams of aminopropyltriethoxysilane (Dow Corning Z-6011) in 200 grams acetone and 760 grams of deionized water and stirred overnight. The slurry was filtered with a Buchner funnel, rinsed with water, and dried at 105° C. to constant weight.

Example 3

Surface Modification of Expanded Volcanic Ash

A total of 1000 grams of micronized and expanded volcanic ash was mixed with 40 grams of tetraethyl orthosilicate (Dow Corning Z-6697) in 200 grams acetone and 760 grams of deionized water and stirred overnight. The slurry was filtered with a Buchner funnel, rinsed with water, and dried at 105° C. to constant weight.

Example 4

Surface Modification of Expanded Volcanic Ash

A total of 1000 grams of micronized and expanded volcanic ash was charged to a heated rotating dryer and 40 grams of aminopropyltriethoxysilane (Dow Corning Z-6011) was sprayed into the dryer over 30 minutes. After 4 hours of mixing, sample was dried at 105° C. to constant weight.

Example 5

AOM Microencapsulation of Surface-Modified Expanded Volcanic Ash

A reactor was charged with 7000 grams of deionized water then 2000 grams of surface-modified expanded volcanic ash (as produced in Example 2) with stirring. 712.8 grams of ammonium dimolybdate (Alfa Aesar) was added proportionally over 20 minutes, then 620.6 grams of molybdenum trioxide (Alfa Aesar) was added proportionally over 20 minutes. The mass was heated with stirring to 88° C. and stirred 3 hours. The mass was cooled to 66° C. and stirred 1 hour then filtered on a Buchner funnel and pulled to no drips. The filtrate was saved for subsequent batches. The filter cake was re-suspended in 7000 grams of deionized water at 66° C. and re-filtered and pulled to no drips. The filter cake was dried to constant weight at 150° C. then air jet milled to a fine powder of average particle size of 2 microns in diameter. The yield was 3200 grams of an off-white powder with 40 wt % AOM (based on elemental analysis) microencapsulating expanded volcanic ash.

Example 6

AOM Microencapsulation of Surface-Modified Expanded Volcanic Ash

A reactor was charged with saved filtrate from Example 5 and diluted with deionized water to 7000 grams total then 2000 grams of surface-modified expanded volcanic ash (as produced in Example 2) with stirring. 712.8 grams of ammonium dimolybdate was added proportionally over 20 minutes, then 620.6 grams of molybdenum trioxide was added proportionally over 20 minutes. The mass was heated with stirring to 88° C. and stirred 3 hours. The mass was cooled to 66° C. and stirred 1 hour then filtered on a Buchner funnel and pulled to no drips. The filtrate was saved for subsequent batches. The filter cake was re-suspended in 7000 grams of deionized water at 66° C. and re-filtered and pulled to no drips. The filter cake was dried to constant weight at 150° C. then milled to a fine powder. The yield was 3280 grams of an off-white powder with 40 wt % AOM (based on elemental analysis) microencapsulating expanded volcanic ash.

Figure 2:
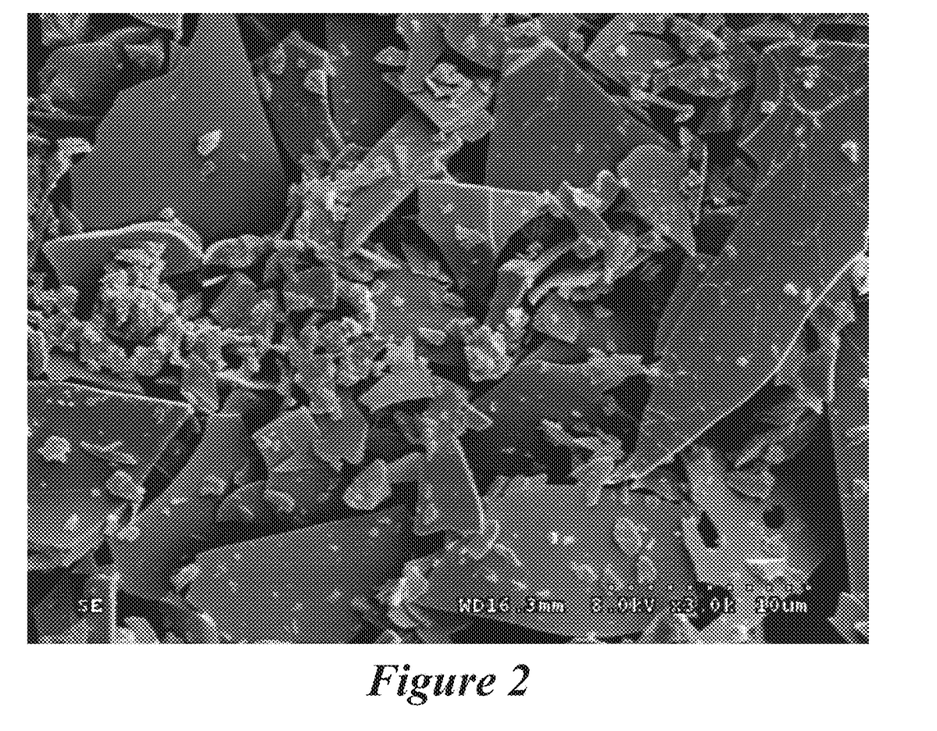
FIG. 2 is a scanning electron micrograph of surface-modified expanded volcanic ash coated with AOM that was made in Example 6 according to embodiments of the present invention.

The product made in Example 6 was subjected to scanning electron microscopy (see FIG. 2).

It was observed that the product made in Example 6 had a sheet-like morphology rather than rod-like morphology.

Figure 3:
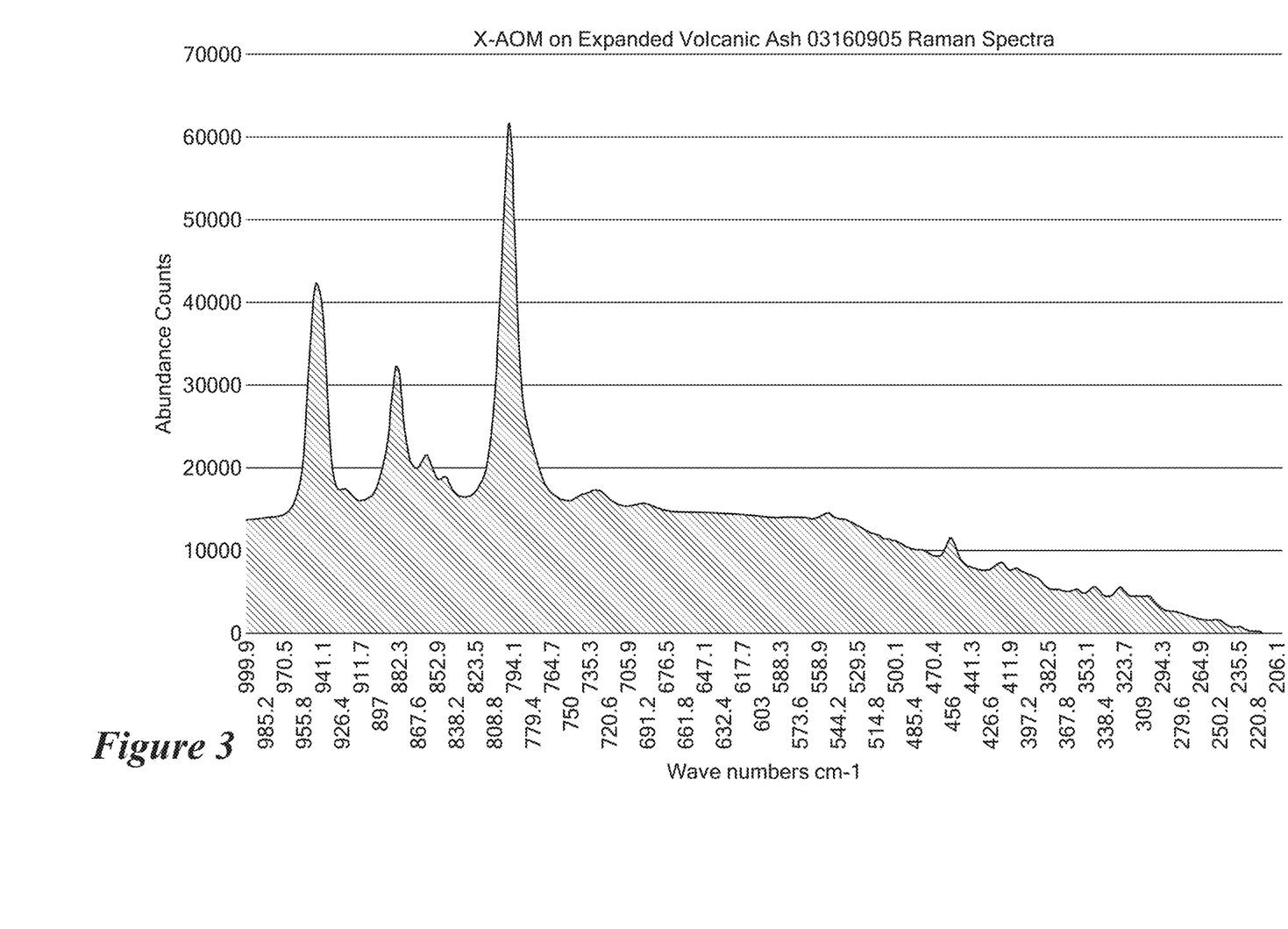
FIG. 3 is a Raman Spectra showing the surface-modified expanded volcanic ash coated with AOM that was made in Example 6 according to embodiments of the present invention.
Figure 4:
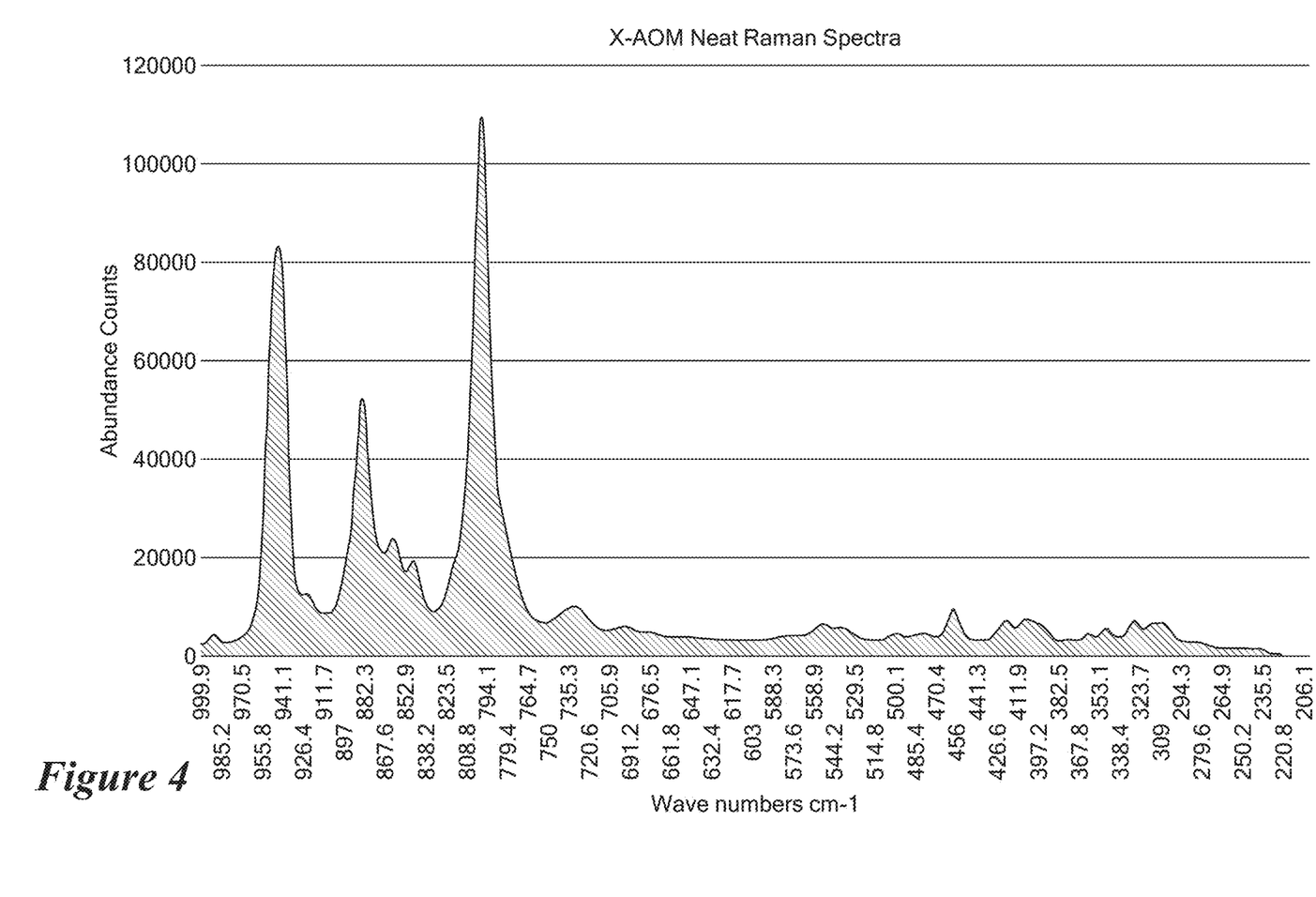
FIG. 4 is a Raman Spectra showing X-AOM made according to the prior art commercial "wet" process.
Figure 5:
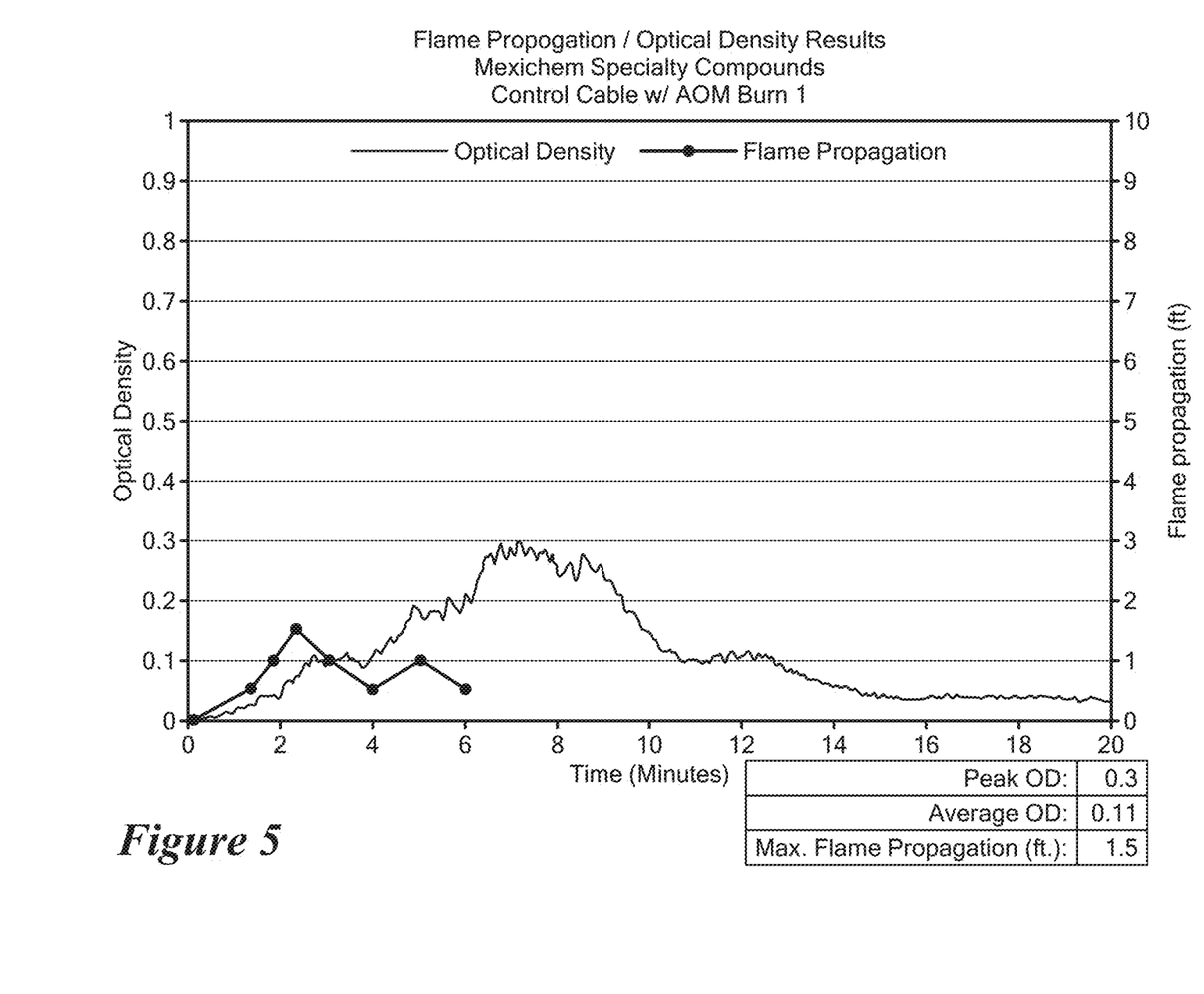
FIG. 5 is a graph showing the flame propagation and optical density results for Sample A-1 made in Example 10 according to embodiments of the present invention.
Figure 6:
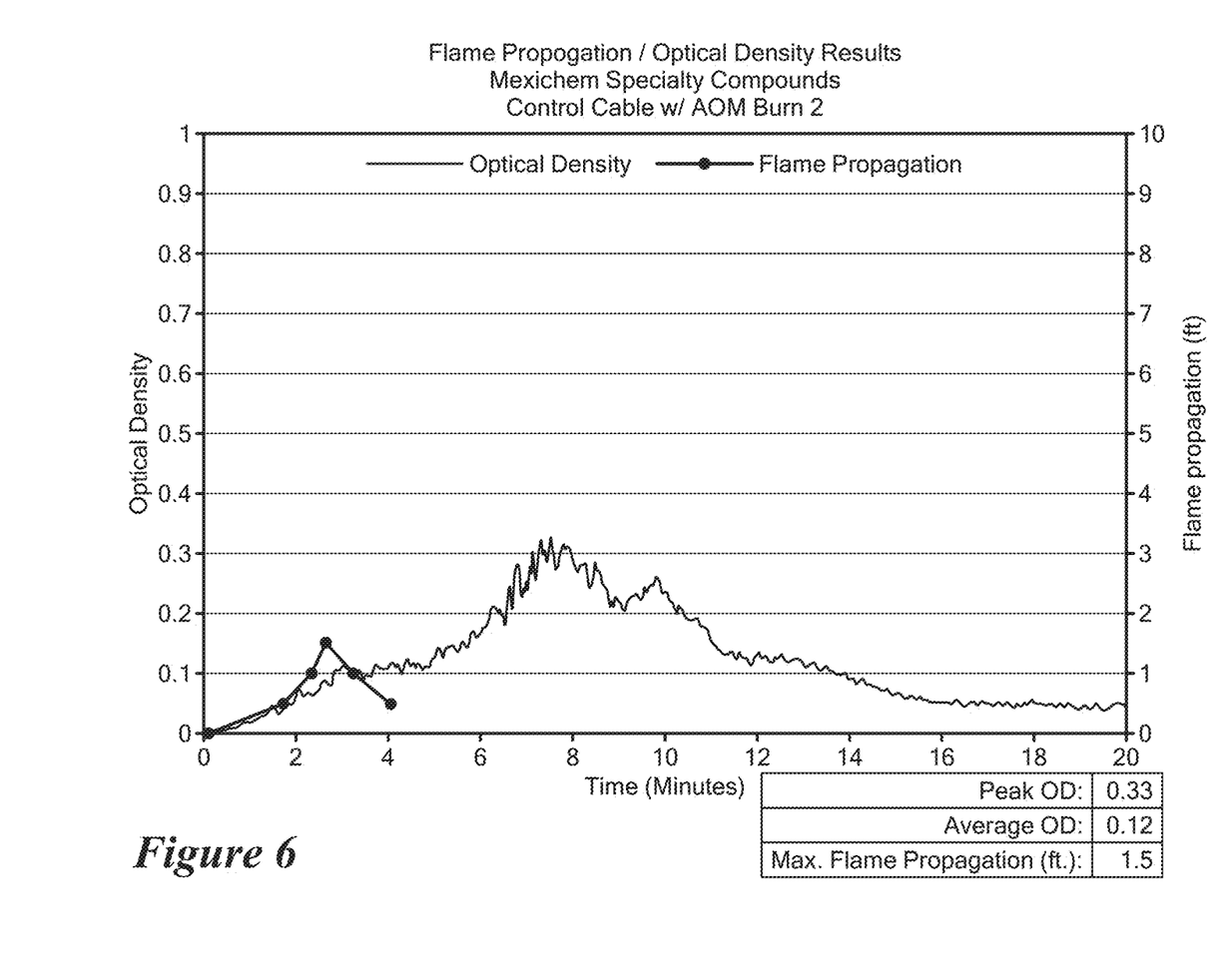
FIG. 6 is a graph showing the flame propagation and optical density results for Sample A-2 made in Example 11 according to embodiments of the present invention.
Figure 7:
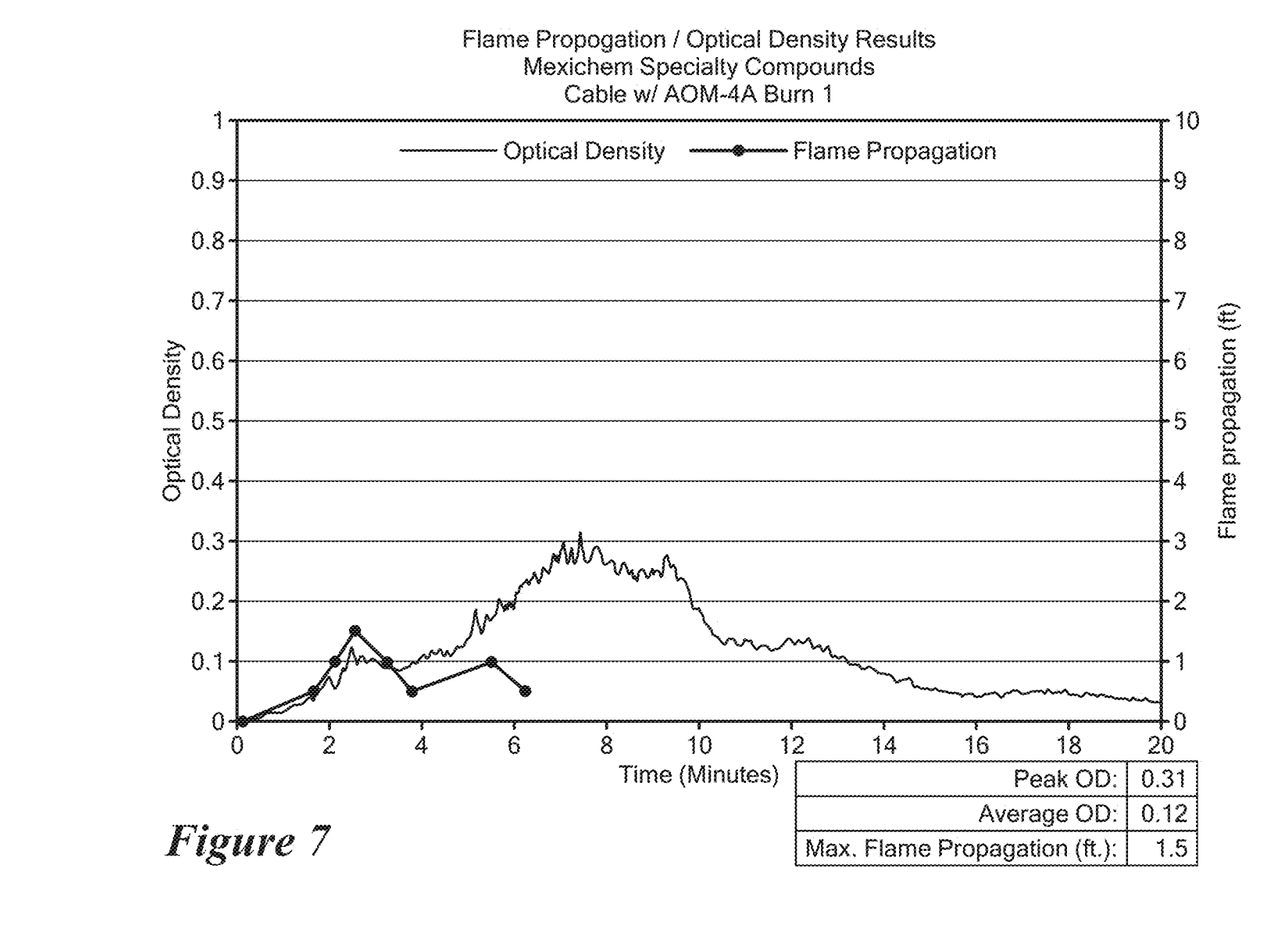
FIG. 7 is a graph showing the flame propagation and optical density results for Sample B-1 made in Example 12 according to embodiments of the present invention.
Figure 8:
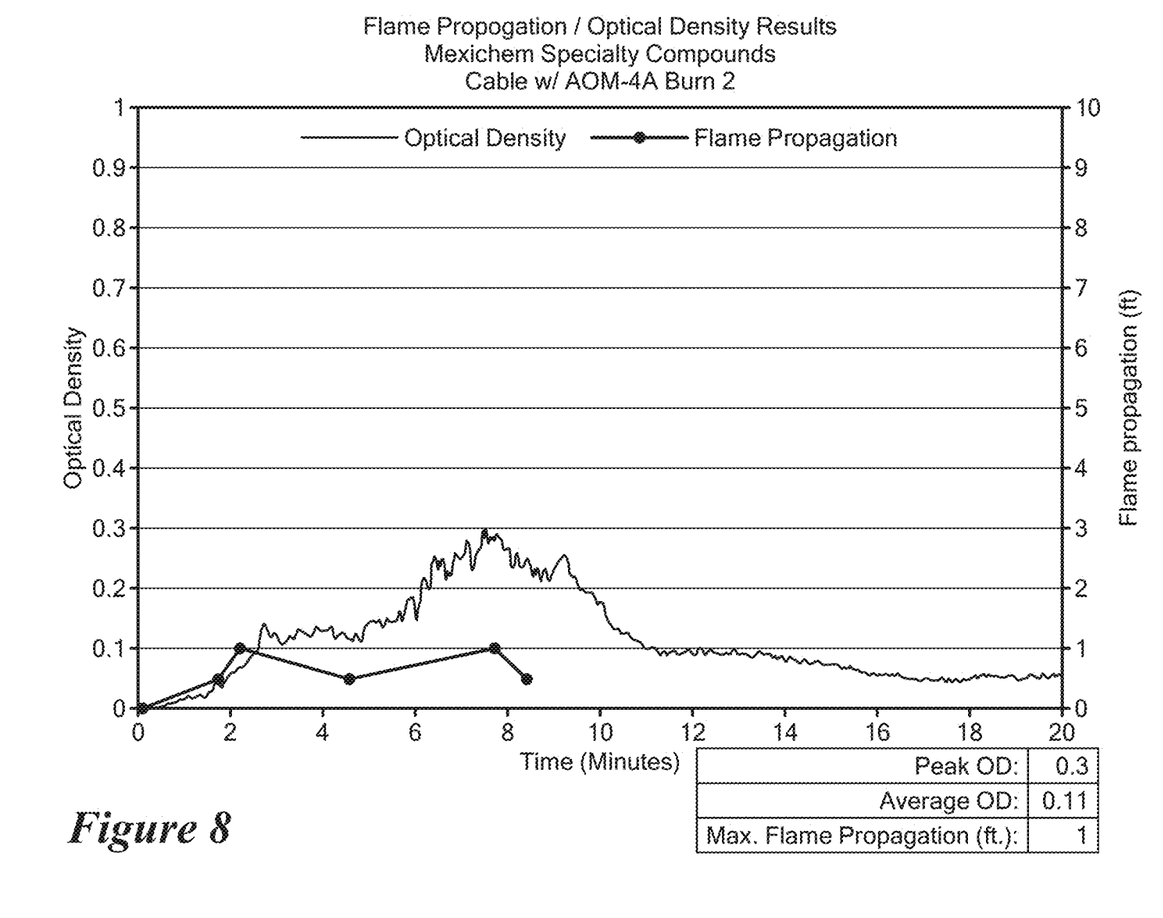
FIG. 8 is a graph showing the flame propagation and optical density results for Sample B-2 made in Example 13 according to embodiments of the present invention

The product made in Example 6 was also subjected to Raman spectroscopy with comparison to commercial "wet method" AOM supplies, as described above in the background section. The Raman spectra are shown in FIGS. 3 and 4, respectively.

It was observed that the relative abundance of the "X-AOM" isomer (determined at 796-798 cm$^{-1}$ wave numbers) was 20-25% higher concentration versus commercial AOM prepared from the "wet" process. This higher relative abundance of the "X-AOM" isomer may improve the smoke suppression performance of the product in polymeric composites.

Example 7

Melamine Octamolybdate Microencapsulation of Surface-Modified Expanded Volcanic Ash A reactor was charged with 3000 grams of deionized water and 93.7 grams of glacial acetic acid. The pH was adjusted to 5 to 7 (as is by a pH meter) with concentrated ammonium hydroxide. 320 grams of surface-modified expanded volcanic ash (as produced in Example 2) was added with stirring followed by 96.9 grams melamine and 221.4 grams of molybdenum trioxide. The reactor was sealed and heated under pressure at 135° C. for 3 hours then cooled to 30° C. The slurry was filtered on a Buchner funnel and was washed to neutrality with deionized water. The filter cake was dried under full vacuum at 135° C. to constant weight then air jet milled to an average particle size of 2 microns in diameter. The resultant white powder (635 grams) was analyzed and found to contain 50 wt % melamine octamolybdate (based on elemental analysis) microencapsulating expanded volcanic ash.

Example 8

Calcium Molybdate Microencapsulation of Surface-Modified Expanded Volcanic Ash

A reactor was charged with 2000 grams of deionized water and 241.95 grams of sodium molybdate dihydrate (SigmaAldrich) with stirring until dissolved. To this solution, 200 grams of surface-modified expanded volcanic ash (as produced in Example 2) was added with stirring. A separate solution of calcium chloride (110.98 grams) in 1000 grams deionized water. The calcium chloride solution was added dropwise to the sodium molybdate/expanded volcanic ash slurry with vigorous stirring over 1 hour then stirred 1 hour. The slurry was filtered on a Buchner funnel and was washed to neutrality with deionized water. The filter cake was dried under full vacuum at 135° C. to constant weight then air jet milled to an average particle size of 2 microns in diameter. The resultant white powder (390 grams) was analyzed and found to contain 51 wt % calcium molybdate (based on elemental analysis) microencapsulating expanded volcanic ash.

Example 9

Zinc Molybdate Microencapsulation of Surface-Modified Expanded Volcanic Ash

A reactor was charged with 2000 grams of deionized water and 241.95 grams of sodium molybdate dihydrate (SigmaAldrich) with stirring until dissolved. To this solution, 200 grams of surface-modified expanded volcanic ash (as produced in Example 2) was added with stirring. A separate solution of zinc chloride (136.29 grams) in 1000 grams deionized water. The zinc chloride solution was added dropwise to the sodium molybdate/expanded volcanic ash slurry with vigorous stirring over 1 hour then stirred 1 hour. The slurry was filtered on a Buchner funnel and was washed to neutrality with deionized water. The filter cake was dried under full vacuum at 135° C. to constant weight then air jet milled to an average particle size of 2 microns in diameter. The resultant white powder (390 grams) was analyzed and found to contain 53 wt % zinc molybdate (based on elemental analysis) microencapsulating expanded volcanic ash.

Examples 10-13

Examples 10-13 were made with 40% AOM coating on samples A-1, A-2, B-1, and B-2, respectively. The samples are described below in Table 1 and FIGS. 5-8 show graphs of the flame propagation and optical density results of the samples.

TABLE 1

| Sample Test No. | Test Code | Sample Description | Cable OD (in) | Number of Lengths | Max. flame (ft) | Peak OD | Avg. OD | Maximum Damage Height (ft) | | |
|---|---|---|---|---|---|---|---|---|---|---|
| | | | | | | | | Melt | Char | Ash |
| | | Criteria: | | | ≤5.0 | ≤0.50 | ≤0.15 | NA | NA | NA |
| A-1 | 01122105 | ID = AG001 SMOKEGUARD ® III 1018 jkt (18-mil)/ BerkTek 4x0 CAT 6 | 0.25 | 45 | 1.5 | 0.3 | 0.11 | 19.5 | 15.0 | 1.0 |
| A-2 | 01122106 | ID = AG001 SMOKEGUARD ® III 1018 jkt (18-mil)/ BerkTe4x0 CAT 6 | 0.25 | 45 | 1.5 | 0.33 | 0.12 | 19.5 | 14 | 1 |
| B-1 | 01122109 | ID = AG002 SGX 16-256-B jkt (18-mil)/ BerkTek 4x0 CAT 6 | 0.25 | 45 | 1.5 | 0.31 | 0.12 | 19.5 | 11 | 1 |
| B-2 | 01122111 | ID = AG002 SGX 16-256-B jkt (18-mil)/ BerkTek 4x0 CAT 6 | 0.25 | 45 | 1.0 | 0.3 | 0.11 | 19.5 | 13 | 1.5 |

Although the above discussion discloses various exemplary embodiments, those skilled in the art may make various modifications to, or variations of, the illustrated embodiments without departing from the inventive concepts disclosed herein.

What is claimed is:

1. A smoke suppressant composition comprising:
    a substrate formed from volcanic ash;
    a multi-functional coupling agent bonded to the substrate; and
    a smoke suppressant disposed on at least a portion of the substrate, wherein the smoke suppressant is ammonium octamolybdate (AOM) having a thickness between about 1 nm to about 1 micron.

2. The smoke suppressant composition of claim 1, wherein the volcanic ash is expanded volcanic ash.

3. The smoke suppressant composition of claim 1, wherein the volcanic ash is unexpanded volcanic ash.

4. The smoke suppressant composition of claim 1, wherein the volcanic ash is formed from particles having an average particle size between about 50 nm to about 5 microns in diameter.

5. The smoke suppressant composition of claim 4, wherein the particles are milled.

6. The smoke suppressant composition of claim 1, wherein the multi-functional coupling agent includes one or more of silanol, methoxy, ethoxy, or amino functional groups that are bonded to the substrate.

7. The smoke suppressant composition of claim 1, wherein the multi-functional coupling agent includes two or more types of functional groups and the functional groups are formed from amines, carboxylic acids, alcohols, esters, anhydrides, epoxides and/or unsaturated hydrocarbons.

8. A polymeric composite comprising:
    a polymeric resin; and
    an additive comprising the smoke suppressant composition of claim 1.

9. The polymeric composite of claim 8, wherein the polymeric resin includes halogenated polymers, vinyl polymers, polyolefins, polyesters, polyacrylates, polyamides, polycarbonates, polyurethanes, silicones, epoxides and/or rubbers.

10. The polymeric composite of claim 8, wherein the polymeric resin includes polyvinyl chloride or vinylidene chloride.

11. A method of forming a smoke suppressant composition, the method comprising:
    providing a substrate formed from volcanic ash;
    bonding a multi-functional coupling agent to the substrate; and
    disposing a smoke suppressant on at least a portion of the substrate, wherein the smoke suppressant is ammonium octamolybdate (AOM) having a thickness between about 1 nm to about 1 micron.

12. The method of claim 11, wherein the ammonium octamolybdate (AOM) is formed by reacting ammonium dimolybdate with molybdenum trioxide in water in the presence of the substrate.

* * * * *